(12) United States Patent
Liu et al.

(10) Patent No.: US 10,712,212 B2
(45) Date of Patent: Jul. 14, 2020

(54) OVERHEAT DETECTION USING A FIBER BRAGG GRATINGS ARRAY BY TIME-OF-FLIGHT

(71) Applicant: Kidde Technologies, Inc., Wilson, NC (US)

(72) Inventors: Lei Liu, Wake Forest, NC (US); Mark Sherwood Miller, Lakeville, MN (US)

(73) Assignee: Kidde Technologies, Inc., Wilson, NC (US)

( * ) Notice: Subject to any disclaimer, the term of this patent is extended or adjusted under 35 U.S.C. 154(b) by 126 days.

(21) Appl. No.: 16/008,358

(22) Filed: Jun. 14, 2018

(65) Prior Publication Data

US 2019/0383672 A1  Dec. 19, 2019

(51) Int. Cl.
*G01K 11/32* (2006.01)
*B64D 45/00* (2006.01)

(52) U.S. Cl.
CPC .......... *G01K 11/3206* (2013.01); *B64D 45/00* (2013.01); *B64D 2045/009* (2013.01); *B64D 2045/0085* (2013.01)

(58) Field of Classification Search
CPC .............. G01K 11/3206; B64D 45/00; B64D 2045/0085; B64D 2045/009
See application file for complete search history.

(56) References Cited

U.S. PATENT DOCUMENTS

| | | | |
|---|---|---|---|
| 6,785,004 B2 | 8/2004 | Kersey et al. | |
| 8,402,834 B1 | 3/2013 | Moslehi et al. | |
| 9,429,480 B2 | 8/2016 | Smith et al. | |
| 2002/0125414 A1 | 9/2002 | Dammann | |
| 2004/0067003 A1 | 4/2004 | Chliaguine et al. | |
| 2013/0275055 A1* | 10/2013 | Hansen | G01H 9/004 702/34 |
| 2013/0322490 A1 | 12/2013 | Bell et al. | |
| 2015/0369731 A1 | 12/2015 | Taverner et al. | |
| 2017/0138802 A1 | 5/2017 | Fisk et al. | |

(Continued)

OTHER PUBLICATIONS

U.S. Appl. No. 15/603,126, Titled "Method and System for Fast Determination of the Wavelength of a Light Beam," filed May 23, 2017.

(Continued)

*Primary Examiner* — Jamil Ahmed
(74) *Attorney, Agent, or Firm* — Kinney & Lange, P.A.

(57) ABSTRACT

A method for detecting and determining a location of an overheat condition includes producing a narrowband optical signal with a laser source and optical pulse generator. The optical signal is sent into the optical fiber. A plurality of reflected optical signals is received. Reflection intensities are detected using a photodetector. The reflection intensities are compared with a triggering threshold. Response times of the reflected optical signals are recorded whenever the reflection intensity of the optical signals is greater than the triggering threshold. The narrowband optical signal is adjusted to another wavelength. An anomaly reflected optical signal is identified using a characteristic of the timings obtained through a range of wavelengths. The location of the overheat condition recorded response times is calculated. The location and existence of the overheat condition is communicated.

18 Claims, 6 Drawing Sheets

(56) References Cited

U.S. PATENT DOCUMENTS

2019/0353552 A1* 11/2019 Doyle .................. G01M 3/047

OTHER PUBLICATIONS

U.S. Appl. No. 15/913,664, Titled "Device and Method of Calibrating Fiber Bragg Grating Based Fiber Optic Overheat Systems," filed Mar. 6, 2018.
Extended European Search Report for EP Application No. 19178878. 5, dated Nov. 5, 2019, 8 pages.

* cited by examiner

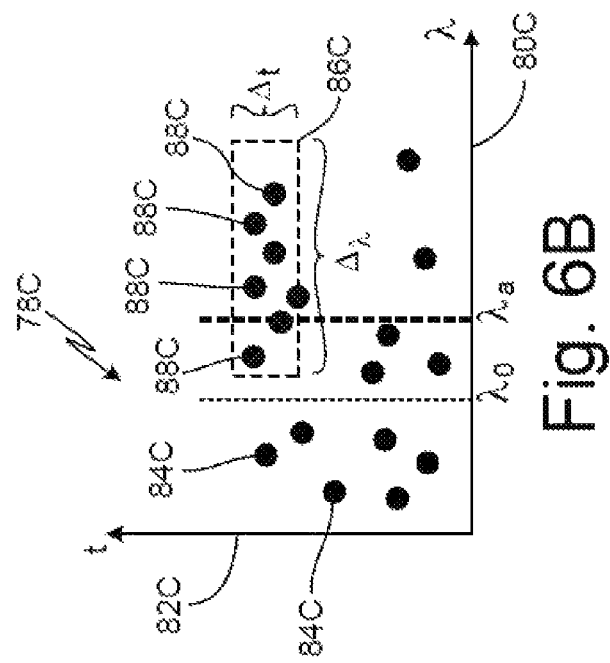
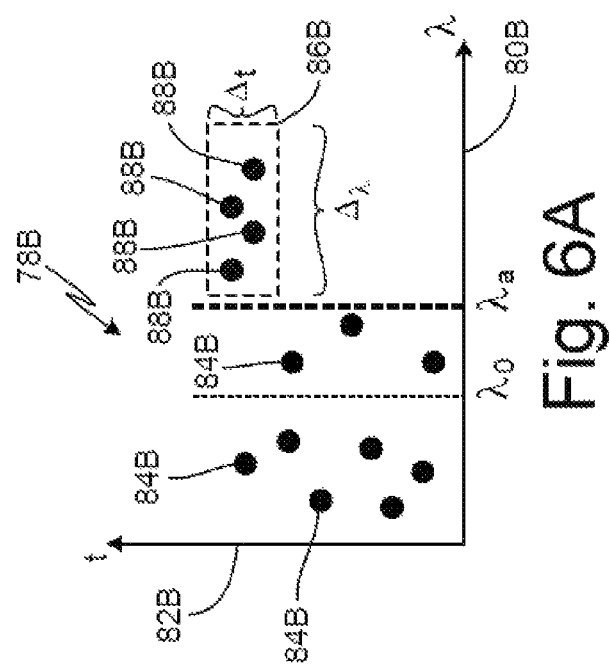

OVERHEAT DETECTION USING A FIBER BRAGG GRATINGS ARRAY BY TIME-OF-FLIGHT

BACKGROUND

This disclosure relates generally to aircraft system health monitoring for overheat and fire detection systems. More particularly, this disclosure relates to optical signal analysis of aircraft system health monitoring systems.

During operation of an aircraft, numerous on-board components and sub-systems are continuously or periodically monitored. Various methods for monitoring these components and sub-systems of the aircraft have been used. For example, sensors and/or transducers can be affixed to an aircraft at specific locations so as to produce signals indicative of various physical phenomena experienced at those specific locations. These signals can then be transmitted to an analyzer that interprets the signals received by the analyzer. These signals can be processed to generate parametric data that can be correlated to measurements of physical phenomena. Some of the specific locations where it would be desirable to affix a sensor and/or transducer might be locations that have harsh environments. For example, some such locations might expose any affixed sensor to high temperatures, high pressures, high levels of exposure to electromagnetic interference, etc.

In many of these harsh environment locations, optical transducers have found use. Optical sensors and/or transducers can produce optical signals indicative of various physical phenomena. For example, optical sensors and/or transducers can produce optical signals indicative of stress, strain, temperature, tilt, rotation, vibration, pressure, etc. Various sensors and/or transducers employ various types of technologies. For example, some sensors use Fabry-Pérot Interferometry (FPI), while others use fiber Bragg grating (FBG) technologies. Some of these technologies and techniques produce optical signals having a spectrum that is indicative of the measured parameter. Spectrum analysis and/or spectral measurement of such signals is performed to determine a measure of the physical phenomena causing the specific spectrum of the optical signal.

SUMMARY

A method for detecting and determining a location of an overheat condition along an optical fiber includes executing a first set of steps including producing a narrowband optical signal at a wavelength with at least one of a laser source and an optical pulse generator. The optical signal is sent into the optical fiber that includes a plurality of fiber Bragg gratings at spaced locations. A plurality of reflected optical signals reflected by the plurality of fiber Bragg gratings is received. Reflection intensities of the plurality of reflected optical signals are detected using a photodetector. The reflection intensities are compared with a triggering threshold of reflection intensity. Response times of the plurality of reflected optical signals are recorded whenever the reflection intensity of the optical signals is greater than the triggering threshold. The narrowband optical signal is adjusted to another different wavelength. The above steps are repeated in order to step through a range of discrete wavelengths. An anomaly fiber Bragg grating correlated to a measurement parameter, such as overheat temperature or strain, is identified using a characteristic of the timings obtained through a range of wavelengths with a first controller. The location of the overheat condition is also calculated using the timings with a first controller. The existence and location of the overheat condition is communicated to a second controller.

An optical sensing system includes an optical fiber and a control unit. The optical fiber includes a plurality of fiber Bragg gratings at spaced locations. The control unit is physically connected to and in optical communication with the optical fiber and includes an optical pulse generator, a photodetector, a timing detector, a comparator, and a controller. The optical pulse generator is in optical communication with the optical fiber and produces and emits an optical signal into the optical fiber. The optical signal has a starting wavelength that correlates to a measurement parameter. The photodetector is in optical communication with the optical fiber and receives a plurality of reflected optical signals from the plurality of fiber Bragg gratings. The photodetector continually detects a reflection intensity of each of the plurality of reflected optical signals. The comparator is in communication with the photodetector and compares the reflection intensities of the reflected optical signals with a reflection intensity triggering threshold. The timing detector is in communication with the comparator that records a response time whenever the comparator changes status. The controller is in communication with the optical pulse generator and with the timing detector. The controller declares an anomaly fiber Bragg grating based on a constructed map between time-of-flight and wavelength and determines the location of the anomaly fiber Bragg grating based on a time-of-flight between transmission of the optical signal by the optical pulse generator obtained from response times.

A method of identifying an anomaly pulse response signal of an optical sensing system includes setting, with an optical pulse generator, a wavelength of a wavelength-tunable optical signal pulse. The wavelength-tunable optical signal pulse is emitted into an optical fiber that includes a plurality of fiber Bragg gratings at spaced locations. A plurality of reflected optical signals from the plurality of fiber Bragg gratings is received with a photodetector. Times-of-flight of the plurality of reflected optical signals are measured with a timing detector. The times-of-flight of the plurality of reflected optical signals and the wavelength of the wavelength-tunable optical signal pulse are logged. Whether a cycle count is equal to a preset amount of cycle steps is determined. When the cycle count is less than the preset amount of cycle steps, then emitting the wavelength-tunable optical signal pulse into the optical fiber is repeated along with the subsequent steps thereafter. When the cycle count reaches the preset amount of cycle steps, then the measured times-of-flight are graphed. A two-dimensional window is created such that a first dimension of the two-dimensional window is defined by a wavelength range Δλ and a second dimension of the two-dimensional window is defined by a time range Δt. The two-dimensional window is applied to the times-of-flight. A position of the two-dimensional window is changed. Whether a density of time-of-flight points in the two-dimensional window is greater than (or equal to) a threshold value is determined. When the density of time-of-flight points in the two-dimensional window is greater than (or equal to) a threshold value, then detection of an overheat condition is declared and a temperature and a location of the overheat condition is obtained. When the density of time-of-flight points in the two-dimensional window is less than a threshold value, then a position of the two-dimensional window is set to a new position and the step of changing the position of the two-dimensional window and the step(s) thereafter are repeated.

BRIEF DESCRIPTION OF THE DRAWINGS

FIG. 6A is a graph showing reflection intensity as a function of wavelength corresponding to FBGs of the fiber optic sensor system.

FIG. 6B is another graph showing reflection intensity as a function of wavelength corresponding to FBGs of the fiber optic sensor system.

DETAILED DESCRIPTION

Figure 1:
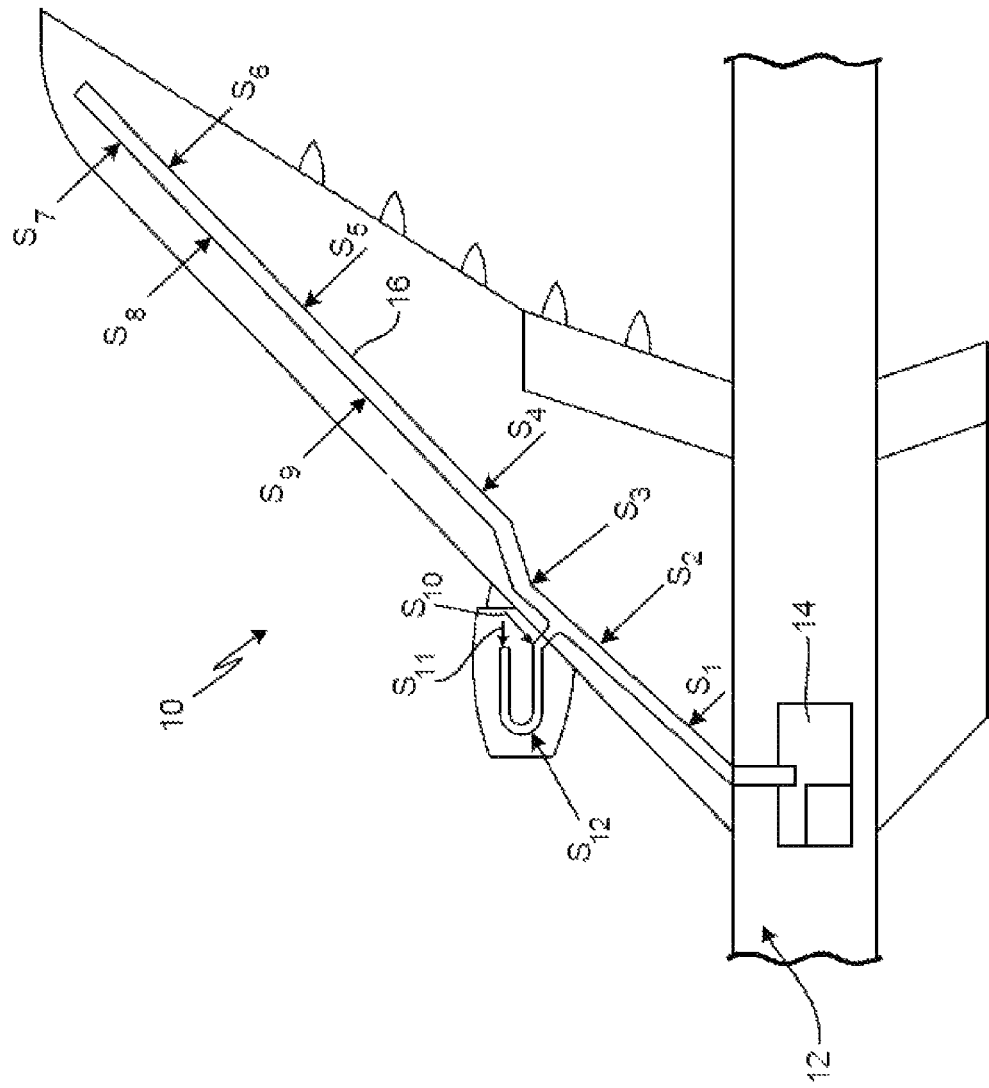
FIG. 1 is a schematic diagram of a fiber optic sensor system for an aircraft.

Existing FBG interrogation systems are based on either wavelength division multiplexing (WDM), or time division multiplexing (TDM). In WDM, the number of FBGs to be interrogated is limited by the availability of wavelength range supported by hardware, i.e. laser sources and photo-detectors; while in TDM, the spacing between FBGs is limited by the period of the optical pulse. There is a need to interrogate an array of FBGs with nominally identical center wavelength, serially coexisting in a single fiber with a large number of FBGs (e.g., greater than 100) and dense spacing between adjacent FBGs (e.g., less than 5 cm). Temperature or strain changes on one or a few FBGs will cause changes to its/their reflection spectrum, and the changes, if successfully detected, can be used to measure temperature/strain. Such temperature or strain change events are referred to as anomaly events, and the corresponding FBGs located at these events are likewise called anomaly FBGs. Nevertheless, spectral shadowing by the rest of FBGs often masks small spectrum changes and makes measurement only applicable for very large changes in temperature/strain. Neither a direct application of existing TDM and WDM nor a combination of them will be able to address the need.

Existing WDM based systems illuminate FBGs with a continuous wave light source, either with a broadband or a scanning narrowband, and use a reflection spectrum to interrogate temperature/strain of the optical fiber. The interrogation assumes that the reflection spectrums from individual FBGs include different wavelengths such that the peak or shape of an individual spectrum can be used. An aggregated reflection spectrum from FBGs with overlapping spectra with respect to wavelength, however, is complicated by spectral shadowing and multiple reflections, which are challenges in determining if one or more FBGs in such an array are subject to elevated temperature or strain.

Existing TDM based systems illuminate FBGs with a short pulse, and use time domain windows to multiplex and interrogate FBGs. The interrogation requires FBGs with weak reflectivity to minimize crosstalk among FBGs in the round trip pulse travel. Also, the spacing between adjacent FBGs needs to be larger than the product of pulse time and light speed in order to avoid overlapping of reflection in the time domain.

In this disclosure, pulse based interrogation of a fiber optic sensor system includes sending a pulse with a specific wavelength down the optical fiber and monitoring return pulses reflected by (FBGs) in the optical fiber. The reflection spectra of two or more FBGs can overlap, and the spacing between adjacent FBGs does not need to be larger than the product of pulse time and light speed. The wavelength of the source pulse is adjusted in order to sweep a wavelength band that is correlated to an anomaly or anomalies of interest. At each discrete wavelength, a time domain response signal is measured, and a reflection intensity triggering threshold is applied to the time domain response signal in order to determine time-of-flight at which the intensity of the response signal are above the reflection intensity triggering threshold. After sweeping through the entire wavelength band, a two-dimensional time-of-flight versus wavelength map can be constructed. A two dimensional window can be applied to and moved through the map to measure density of time-of-flight points. Anomalies, or overheat conditions are then identified based on the density measure and the locations of anomalies can be derived by the position of the window. In the examples discussed herein, the term "anomaly" generally refers and/or relates to the occurrence or presence of an overheat condition or temperature, such as can be experienced by an optical fiber network (shown in FIG. 1). Put another way, the term "anomaly" refers to a shift in the reflected wavelength of a FBG due to elevated strain or temperature.

FIG. 1 is a schematic diagram of an exemplary system for monitoring health and usage of components on an aircraft wing using optical spectral analysis. In FIG. 1, a portion of aircraft 10 is shown with fiber optic sensor system 12. Fiber optic sensor system 12 includes control unit 14, optical fiber network 16, and sensors $S_1$-$S_N$.

In this example, aircraft 10 is an airplane. In other examples, aircraft 10 can be a helicopter, airship, glider, or other type of vessel capable of flight. In other examples, fiber optic sensor system 12 can be used in conjunction with a ground-based, subterranean, or water-based vehicle, building, or other structure. Fiber optic sensor system 12 is a system for detecting overheat events and/or specific temperature values throughout various areas of aircraft 10. Control unit 14 is a digital computer and can include one or more electronic devices. In some examples, control unit 14 can include a microprocessor, a microcontroller, application-specific integrated circuit (ASIC), a digital signal processor (DSP), a field programmable gate-array (FPGA), or other equivalent discrete or integrated logic circuitry. As will be discussed in the examples shown in FIG. 2, control unit 14 can also include an optical pulse generator, a coupler, a laser source, a photo-detector, a comparator, a timing detector, and/or a controller.

Optical fiber network 16 is a network of one or more fiber optic cables configured to communicate an optical signal. Optical fiber network 16 can include one or more optical fibers configured in a loop or single-ended arrangement. In this example, sensors $S_1$-$S_N$ are fiber Bragg gratings ("FBGs") configured to sense a temperature or overheat condition along optical fiber network 16. In this example, sensors $S_1$-$S_N$ include twelve sensors (e.g., N=12). In other examples, N can be more or less than twelve.

Additional examples of fiber optic overheat detection systems can be found in the following co-pending applications: U.S. patent application Ser. No. 15/603,126 filed on May 23, 2017 and U.S. patent application Ser. No. 15/913,664 filed on Mar. 6, 2018, which are herein incorporated by reference in their entireties.

Fiber optic sensor system 12 is disposed and mounted within portions of aircraft 10. Control unit 14 is disposed within a portion of aircraft 10 near a cockpit of aircraft 10. In this example, control unit 14 is in optical communication with optical fiber network 16. Optical fiber network 16 is disposed in a portion of a wing of aircraft 10. In other examples, fiber optic sensor system 12 can be disposed throughout any other portion of aircraft 10, such as in a fuselage, wheel-well, cockpit, gearbox, engine, etc. Sensors $S_1$-$S_N$ are disposed in optical fiber network 16 along portions of optical fiber network 16. In this example, sensors $S_1$-$S_N$ are located at various specific locations along optical fiber network 16.

In this example, control unit 14 coordinates operation of a laser, a pulse generator, and a timing generator to generate a pulse of optical energy and to direct the generated pulse into optical fiber network 16. For example, control unit 14 controls a laser source to sweep frequencies and controls an optical pulse generator to allow a pulse of light from the laser to pass through a coupler and into optical fiber network 16. Optical fiber network 16 receives the generated pulse of optical energy and transmits the received pulse of optical energy to sensors $S_1$-$S_N$ distributed along optical fiber network 16. Sensors $S_1$-$S_N$ are configured to generate a narrow-band optical signal in response to the transmitted light beam. As each of sensors $S_1$-$S_N$ encounters the transmitted pulse of optical energy, a portion of the encountered pulse of optical energy is reflected by sensors $S_1$-$S_N$. The portion of the pulse of optical energy reflected by each sensor $S_X$ (e.g., X representing any number from 1 to N) is indicative of the physical parameter sensed by sensor $S_X$. The portion of the pulse of optical energy reflected by some sensors can be of a narrow band of wavelengths and/or be characterized by a specific wavelength. That specific wavelength and/or narrow-band of wavelengths can be indicative of the sensed physical parameter, such as temperature of the optical fiber or an overheat condition. Control unit 14 then receives and processes the sequence of reflected pulses of optical energy, so as to determine the physical parameters sensed by sensors $S_1$-$S_N$.

Figure 2:
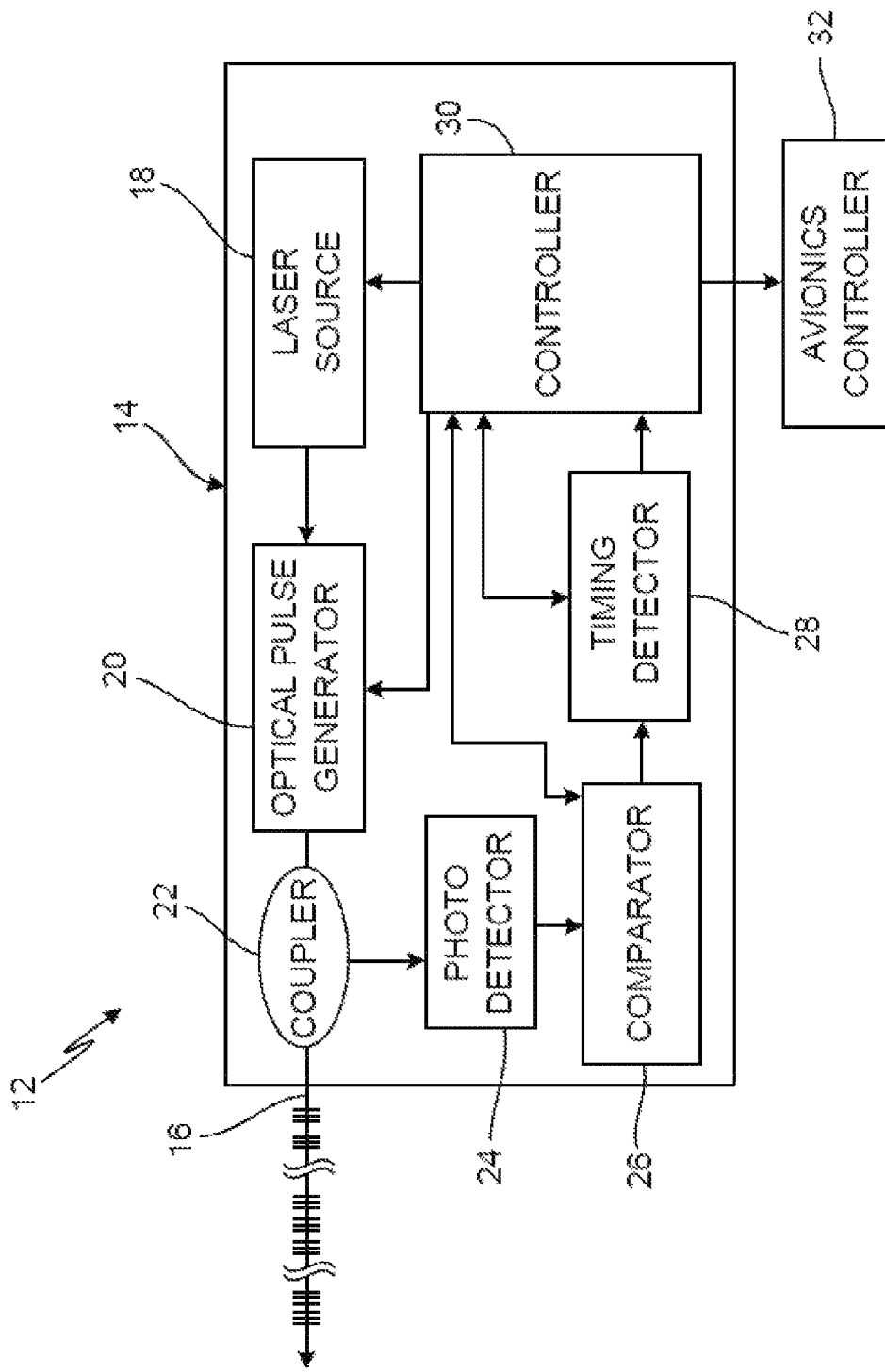
FIG. 2 is a schematic block diagram of the fiber optic sensor system.

FIG. 2 is a schematic block diagram of fiber optic sensor system 12 and shows control unit 14 (including laser source 18, optical pulse generator 20, coupler 22, photodetector 24, comparator 26, timing detector 28, and controller 30), optical fiber 16, and avionics controller 32. Laser source 18 can be any suitable narrowband optical source for providing an optical signal. In one example, laser source 18 can be a light-emitting diode laser or a gas or solid laser. It should be further understood that laser source 18 can be configured to provide the optical signal in any suitable manner, such as through a single pulse at a fixed wavelength, a tunable swept-wavelength, a broadband signal, and/or a tunable pulse. Optical pulse generator 20 is a device that regulates the intensity and duration of optical signals produced by laser source 18. Coupler 22 is an optical component with one or more optical inputs and one or more optical outputs, which are capable of splitting an optical signal into multiple channels. In another example, coupler 22 can be a circulator. Photodetector 24 and timing detector 30 are receivers configured to receive an optical signal. For example, photodetector 24 and/or timing detector 30 can be a photodiode, a photodiode array, a phototransistor, an optical circulator (e.g., a non-reciprocal optical device with three or four ports configured such that light entering any of the ports exits from the next port), or any other suitable optical receiving device.

Comparator 26 is a device that compares aspects of a detected optical signal with data from a second source such as stored data, threshold value(s), or data from a second optical signal. For example, comparator 26 can be an analog comparator. In another example, comparator 26 can be a digital controller configured to digitally process data. Timing detector 28 is a detector or timer configured to measure timing windows or periods of signal pulses received by timing detector 28. For example, timing detector 28 can be an analog detector. In another example, timing detector 28 can be a digital detector configured to digitally process data. In yet another example, comparator 26 and/or timing detector 28 can include a digital-to-analog converter ("ADC") incorporated within or located externally to controller 30. Controller 30 is an electronic device that is configured to control, monitor, analyze, and/or store electronic information during and after operation of aircraft 10. In one example, controller 30 includes a computer-readable storage medium.

In one example, controller 30 can include a processor (or processors) configured to implement functionality and/or process instructions for execution within control unit 14. For instance, the processor(s) can be capable of processing instructions stored in or received by control unit 14. Examples of processor(s) can include any one or more of a microprocessor, a controller, a micro-controller, a digital signal processor(s) (DSP), an application specific integrated circuit (ASIC), a field-programmable gate array (FPGA), a Programmable Logic Device (PLD), or other discrete or integrated logic circuitry. Avionics controller 32 is an electronic device that is configured to control, monitor, analyze, and/or store electronic information during and after operation of aircraft 10. In an example, avionics controller 32 can be located in an instrument panel of the cockpit or can be a component of a health management system of aircraft 10.

Controller 30 is electrically connected to laser source 18 and timing detector 28 (the vice versa is also true, e.g., these components are each electrically connected to controller 30). Laser source 18 is connected to optical pulse generator 20. Optical pulse generator 20 is connected to coupler 22. Coupler 22 is connected to optical pulse generator 20, to photodetector 24, and to optical fiber network 16. Photodetector 24 is connected to coupler 22 and to comparator 26. Comparator 26 is connected to photodetector 24 and to timing detector 28. Timing detector 28 is connected to comparator 26 and to controller 30. Avionics controller 32 is disposed externally from control unit 14 and is in electrical communication with controller 30.

In general, fiber optic sensor system 12 is configured to determine whether an overheat condition is present in aircraft 10, to determine the location of the overheat condition, and to determine these two pieces of information at the same time. In one example, laser source 18 can be configured to provide the optical signal as at least one of a tunable swept-wavelength laser and a broadband laser. Optical pulse generator 20 controls the transmission of the optical signal from laser source 18 to optical fiber network 16. For example, optical pulse generator can function as a modulator and/or a switch. Optical pulse generator 20 converts the optical signal from laser source 18 into an optical signal pulse based on instructions received from controller 30. In this example, optical pulse generator 20 is configured to emit the optical signal pulse into optical fiber network 16. In another example, optical pulse generator 20, in combination with laser source 18, is configured to produce a wavelength-tunable optical signal having an optical spectrum that is indicative of a measurement parameter such as a temperature of optical fiber network 16. Optical pulse generator 20 is configured to send the optical signal into optical fiber network via coupler 22.

Coupler 22 is configured to transmit an optical signal pulse from optical pulse generator 20 to optical fiber network 16. Coupler 22 also receives and transmits reflected optical signals from sensors $S_1$-$S_N$ to photodetector 24. Photodetector 24 is configured to detect wavelengths and reflection intensities of the reflected optical signals from sensors $S_1$-$S_N$. In this example, photodetector 24 is configured to detect the wavelength and the amplitude of the anomaly optical signal reflected by an anomaly fiber Bragg grating. Under normal operating conditions (e.g., in the absence of an anomaly overheat condition) of aircraft 10, there are no anomaly FBG sensors associated with an overheat condition and therefore there are also no anomaly reflected optical signals produced. In this example, the anomaly pulse response signal corresponds to a pulse response signal generated by the anomaly fiber Bragg grating, wherein a location of the anomaly fiber Bragg grating corresponds to a location of an overheat condition in aircraft 10.

Comparator 26 is configured to apply a triggering threshold of reflection intensity to the reflected optical signals from sensors $S_1$-$S_N$ to identify whether any of the reflected optical signal reflection amplitudes are above the triggering threshold. For example, comparator 26 identifies a reflected optical signal that is above the triggering threshold based upon a comparison of the reflection intensity of the reflected optical signal with the reflection intensity triggering threshold. In this example, comparator 26 is configured to determine whether a reflected optical signal has a reflection intensity that is equal to or greater than a triggering threshold. In one example, the triggering threshold applied by comparator 26 can be based on a system model that is associated with emitting pulse power, optical attenuations and reflectivity of sensors $S_1$-$S_N$. Timing detector 28 is configured to detect response times whenever the comparator changes its status. In this example, timing detector 28 is configured to identify a response time of the anomaly pulse response signal from the anomaly fiber Bragg grating.

Controller 30 is configured to control, send signals to, and receive signals from laser source 18, optical pulse generator 20, coupler 22, photodetector 24, comparator 26, and timing detector 28. In general, controller 30 of control unit 14 is configured to (i) identify the presence of an anomaly reflected optical signal, then (ii) determine which sensor $S_x$ produced the anomaly reflected signal, then (iii) identify the sensor $S_x$ that produced the anomaly reflected optical signal as an anomaly sensor $S_a$, and then (iv) determine the location of the overheat condition based upon a response time of the anomaly reflected optical signal. In one example, controller 30 is configured to convert the detected wavelengths, reflection intensities, and response times of the plurality of reflected optical signals to pulse response data and to transfer that data to a reflection intensity curve. In another example, controller 30 is configured to determine a triggering threshold of reflection intensity based on at least one of the pulse response data and the reflection intensity curve. In another example, the triggering threshold of reflection intensity is a preset or known value based on operational parameters of the system, e.g., reflectivity of sensors $S_1$-$S_N$, intensity of the optical signal, etc. In another example, controller 30 is configured to determine the location of the anomaly fiber Bragg grating that the anomaly pulse response signal was reflected from based on a total amount of time between when the optical signal is sent to the detection of the anomaly optical signal reflected by the anomaly fiber Bragg grating.

Avionics controller 32 is configured to receive information from controller 30. In one example, avionics controller 32 is configured to communicate information relating to a location of an overheat condition to a health management system (not shown in FIG. 2) of aircraft 10. Avionics controller 32 can be used to communicate information between controller 14 and aircraft 10. In some examples, such information can include aircraft conditions, flying conditions, and/or atmospheric conditions. In some examples, such information can include data processed by controller 14, such as, for example, alert signals. Avionics controller 32 can also include a communications module (not shown). Avionics controller 32, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi devices as well as Universal Serial Bus (USB). In some examples, communication with aircraft 10 can be performed via a communications bus, such as, for example, an Aeronautical Radio, Incorporated (ARINC) standard communications protocol. In another example, aircraft communication with aircraft 10 can be performed via a communications bus, such as, for example, a Controller Area Network (CAN) bus.

Existing fiber optic sensor systems are often limited by their capacity to separately determine whether the overheat condition is present and the location of that overheat condition. This is an issue because to scan the fiber optic sensor system to determine the presence of an overheat condition and then to scan the fiber optic sensor system again to separately determine the location of the overheat condition creates a lot of addition processing time with respect to recordation and analysis of signal data. As will be further discussed with respect to FIGS. 3-6B, fiber optic sensor system 12 and the related operation thereof allows for the determination of whether the overheat condition is present and the determination of the location of the overheat condition to occur simultaneously. This simultaneous determination decreases the amount of time for determining the location of an overheat condition as compared to existing WDM, TDM, and combination WDM/TDM based sensor systems.

Figure 3:
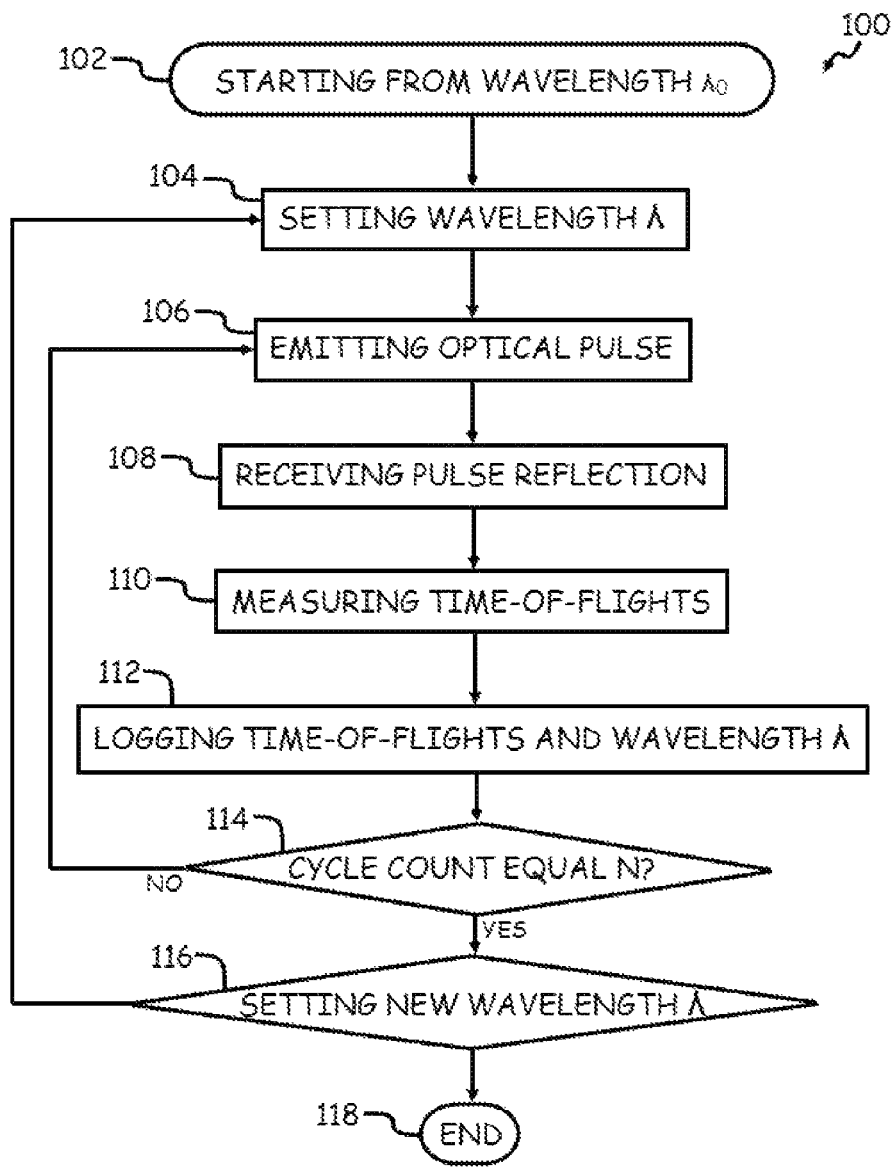
FIG. 3 is a flowchart showing a data collection process of the fiber optic sensor system.

FIG. 3 shows method 100 as a data collection process and includes steps 102, 104, 106, 108, 110, 112, 114, 116, and 118. In step 102, during a first scan or stepping of fiber optic sensor system 12, the wavelength is set by optical pulse generator 20 and by laser source 18 to an initial wavelength $\lambda_0$ such that the scan is started at wavelength $\lambda_0$. In step 104, a wavelength of fiber optic sensor system 12 is set. In step 106, an optical pulse is emitted by optical pulse generator 20 via coupler 22 into optical fiber 16. In step 108, pulse reflections from optical fiber 16 are received by coupler 22 and are sent to photodetector 24. In step 110, the time-of-flights for the received pulse reflections are measured by timing detector 28. In step 112, the time-of-flights and corresponding wavelength for the received pulse reflections are logged. These steps are repeated for an N amount of cycles. For example, step 114 includes determining whether a cycle count equals N. If the cycle count does not equal N, steps 106-114 are repeated. If the cycle count equals N, the wavelength is set to a new, different wavelength λ in step 116. Once a pre-determined range of wavelengths λ are scanned or stepped through, the process ends at step 118.

Figure 4:
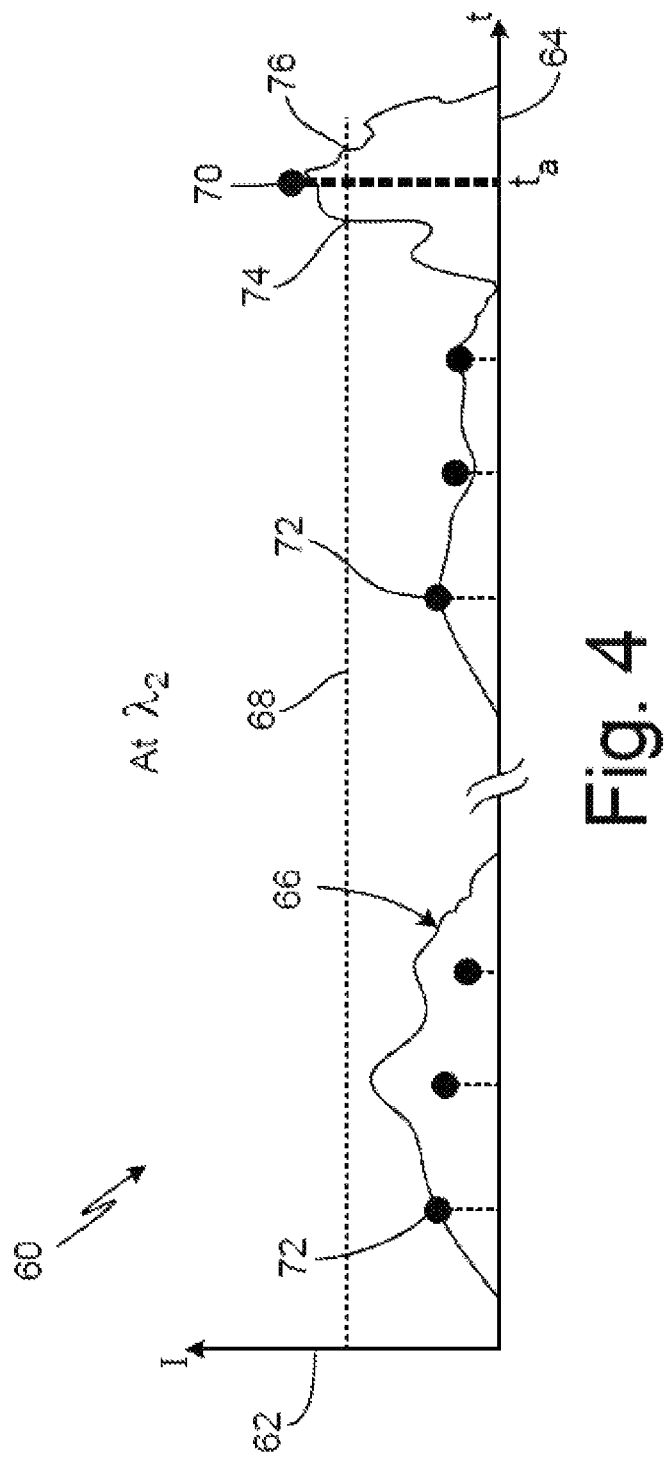
FIG. 4 is a graph showing reflection intensity as a function of time of pulse response data of a plurality of reflected optical signals and includes a triggering threshold.

FIG. 4 includes graph 60 of reflection intensity as a function of time and shows intensity axis 62, time axis 64, reflection intensity curve 66, triggering threshold 68, point 70 (located at time $t_a$), points 72, up-crossing 74, and down-crossing 76.

In this example, graph 60 is an anomaly reflection intensity curve created by controller 30 that includes data from the anomaly response signal (e.g., reflected optical signal $ROS_a$ measured at wavelength $\lambda_a$. Intensity axis 62 is a vertical axis indicative of reflection intensity "I." Time axis 64 is a horizontal axis indicative of time-of-flight, or response time, "t." Reflection intensity curve 66 is representative of an amount of reflection intensity as a function of response time, or time-of-flight, as detected by control unit 14 and its components of optical fiber network 16. In this example, reflection intensity curve 66 is pulse response data of a plurality of reflected optical signals (e.g., of reflected optical signals $ROS_0$-$ROS_N$) created by controller 30.

Triggering threshold 68 is a value of reflection intensity representative of a minimum level of reflection intensity above which reflected optical signals can be identified as anomaly reflected optical signals. In an example, triggering threshold 68 can be chosen to discriminate (or identify) reflected optical signal $ROS_a$ reflected from sensor $S_a$ (e.g., an anomaly FBG, or an FBG sensor located at an overheat condition). Triggering threshold 68 is determined by controller 30 and is applied by comparator 26. Point 70 is a local maximum of reflection intensity curve 66 that is representative of a maximum reflection intensity within a given region or portion of optical fiber network 16 that is greater than triggering threshold 68. Point 70 illustrates a maximum reflection intensity which is dependent upon a length of the pulse, locations of the FBG sensors, and the characteristics of photodetector 24.

Time $t_a$ is a measure of response time, or time-of-flight, corresponding to one of point 70, up-crossing 74, or down-crossing 76. In another example, time $t_a$ can also be estimated from an average of up-crossing 74 and down-crossing 76, which can improve the accuracy of the measurement of time $t_a$. Points 72 are values of reflection intensities along reflection intensity curve 66 that are less than triggering threshold 68. Up-crossing 74 is an intersection point of reflection intensity curve 66 with triggering threshold 68 along a positively-sloped portion of reflection intensity curve 66. For example, up-crossing 74 is a triggering point for an up-crossing of reflection intensity curve 66 with triggering threshold 68. Down-crossing 76 is an intersection point of reflection intensity curve 66 with triggering threshold 68 along a negatively-sloped portion of reflection intensity curve 66.

From graph 60, point 70 is identifiable and/or identified due to the reflection intensity of reflection intensity curve 66 at time $t_a$ being greater than triggering threshold 68. The delta (or difference) between up-crossing 74 and down-crossing 76 is a combined result of pulse length in time domain and the actual length of the anomaly FBG (e.g., sensor $S_a$).

In this example, after point 70 is identified based on triggering threshold 68, time $t_a$ (e.g., response time of the anomaly pulse response signal) is identified by timing detector 28. Based on the identified response time (e.g., time $t_a$) of the anomaly pulse response signal, the location of sensor $S_a$ (e.g., the anomaly fiber Bragg grating that anomaly pulse response signal was reflected from) is determined by controller 30. In another example, an extent of an overheat condition is determined by controller 30 based upon the detected wavelength (e.g., wavelength $\lambda_a$) of the anomaly pulse response signal.

Figure 5:
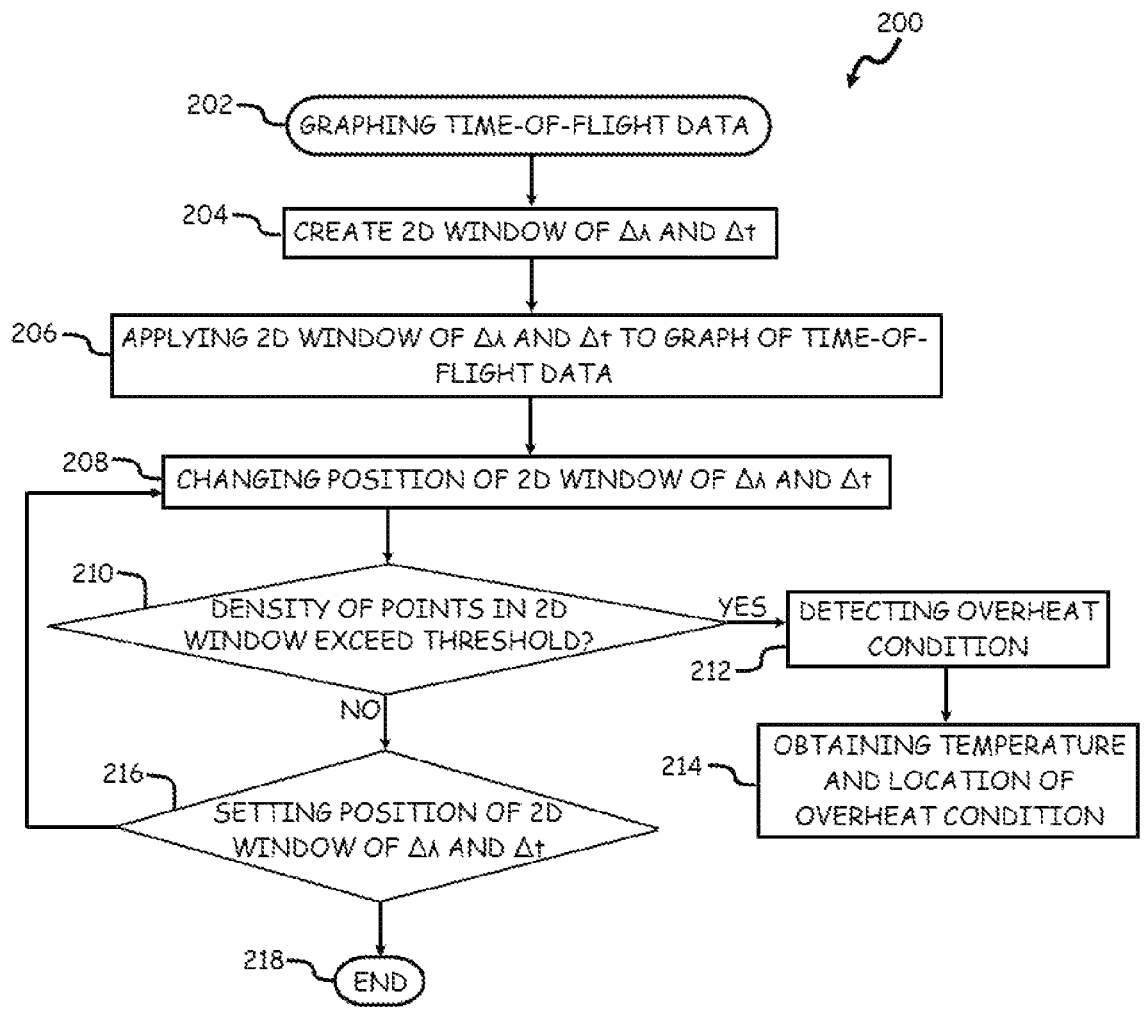
FIG. 5 is flowchart showing a detecting and locating process of the fiber optic sensor system.

FIG. 5 shows method 200 as an overheat detection and location determination process and includes steps 202, 204, 206, 208, 210, 212, 214, 216, and 218. In step 202, time-of-flight and wavelength data, such as that collected in steps 110-112 of method 100 shown in FIG. 3, is applied to a graph (see e.g., graphs 78B and 78C shown in FIGS. 6A and 6B, respectively). In step 204, a 2D (i.e., two dimensional) window defined by range Δλ and range Δt that are based on a design of the system. In step 206, the 2D window is applied to the graph of time-of-flight and wavelength data. In step 208, the position of the 2D window is changed. In step 210, the density of time-of-flight points in the 2D window is determined. If the density of time-of-flight points in the 2D window is greater than (or equal to) a threshold value, an overheat condition is detected in step 212. In step 214, the temperature and location of the overheat condition is obtained. If the density of time-of-flight points in the 2D window is less than a threshold value, the position of the 2D window is set to a new position in step 216. If the new position, or subsequently new positions, of the 2D window do not exhibit a density of the time-of-flight points as having a density greater than (or equal to) a threshold value, then no overheat condition is detected and the process ends in step 218.

FIG. 6A includes graph 78B of time-of-flight as a function of wavelength corresponding to FBG sensors of fiber optic sensor system 12 and shows wavelength axis 80B, time-of-flight axis 82B, points 84B, set 86B of triggered points 88B, wavelength $\lambda_0$, wavelength $\lambda_a$, range $\Delta_t$, and range $\Delta_\lambda$. In this example, graph 78B represents the resultant graph from step 202 shown in method 200.

Wavelength axis 80B is an independent, horizontal axis indicative of wavelength "λ" and includes demarcations of wavelengths $\lambda_0$ and $\lambda_a$. Time-of-flight axis 82B is a dependent, vertical axis indicative of time-of-flight, or response time, "t." Points 84B are data points of reflection intensities that are less than a triggering threshold of reflection intensity. Set 86B is a group or grouping of one or more of triggered points 88B with wavelengths outside an interested wavelength band, which is related to the measurement parameter or overheat temperature. In this example, set 86B is shown as a rectangle. In other examples, set 86B can include a circular, rectangular, parallelogram, or other geometric shape.

Triggered points 88B are local maxima or crossings (e.g., up-crossing 74 or down-crossings 76) of reflection intensities within a given region or portion of optical fiber network 16 that include reflection intensities greater than the triggering threshold of reflection intensity. In this example, four triggered points 88B are shown. In other example, more or less than four triggering points can be included in graph 78B and/or in set 86B. Wavelength $\lambda_0$ is a starting nominal wavelength of optical fiber network 16. Wavelength $\lambda_a$ is a wavelength set by controller 30 and that is associated with a determined overheat temperature. In this example, wavelength $\lambda_a$ is indicative if a wavelength corresponding to a defined maximum ambient temperature. Range $\Delta_t$ is a range of times determined by controller 30 that define the size of the vertical dimension of the rectangular shape of set 86B shown in graph 78B. Range $\Delta_\lambda$ is a range of wavelengths determined by controller 30 that define the size of the horizontal dimension of the rectangular shape of set 86B shown in graph 78B.

In this example, a value of the wavelength at which the wavelength-time plane shown in FIG. 6A is taken can be an identified triggering threshold of reflection intensity. In this example, points 84B and triggered points 88B represent single up-crossing points of intersection with the triggering threshold (similar to up-crossings 74 shown in FIG. 4). As optical fiber network 16 is scanned at a first wavelength, when a reflected optical signal is received at the first wavelength, the up-crossing of that FBG's intensity level is indicated and the time-of-flight is recorded. Then, the scanning wavelength is set to a second wavelength, and optical fiber network 16 is scanned again at the second wavelength to determine the presence of an up-crossing occurring at the second wavelength. This process of identifying and collecting time-of-flight data for just the first detected up-crossing continues throughout a range of wavelength scans. Once the range of wavelengths is completely scanned, all of the up-crossings are then indicated in a graph such as graph 78B to determine if there is a grouping to the right of wavelength $\lambda_a$ (as shown in FIG. 6A) indicating a grouping of triggered points 88B in an overheat condition zone of optical fiber network 16.

In this example, range $\Delta_\lambda$ is a function of the triggering threshold (e.g., triggering threshold 68) and points 84B. In this example, range $\Delta_\lambda$ spans 100 picometers to 200 picometers. In another example, set 86B can include 5 to 10 triggered points 88B with a wavelength of the scanning optical pulse set to 20 picometers. Range $\Delta_t$ is dependent on a quality of the optical pulse and a resolution of photodetector 24. The resolution of photodetector 24 is typically quantified and specified in the design of controller 14 and can be adjusted by controller 30 to set range $\Delta_t$ to accommodate various design parameters such as FBG reflection variation. In one example, a one nanosecond timing resolution design which satisfies a 0.1 meter location requirement would provide range $\Delta_t$ at 3 nanoseconds.

In one example, a density of triggered points 88B can be calculated by controller 30 and applied by controller 30 in a portion of graph 78B to the right of wavelength $\lambda_a$ as part of a moving two-dimensional window (e.g., an additional set of range $\Delta_t$ and range $\Delta_\lambda$) to develop additional indicators for anomaly (e.g., overheat condition or temperature) detection. In another example, a two-dimensional Gaussian filter, such as is used in image processing, can be utilized by controller 30 to identify areas with concentrations of triggered points 88B. In another example, an overheat temperature can be related to measured wavelengths of set 86B or of triggered points 88B. The use of time-of-flight measurements as discussed herein can eliminate the need of scanning wavelengths lower than wavelength $\lambda_a$ which saves processing time. In another example with a multi-zone, multi-wavelength $\lambda_0$ setup, multiple wavelength band limited scanning can be used to determine time-of-flight measurements of fiber optic sensor system 12.

As such, fiber optic sensor system 12 and the above discussed analysis of graphs 34, 42, 52, 60, 78B, and 78C by controller 30 provides the benefit of reducing an amount of false alarms and improving the accuracy in determining time-of-flight. These two benefits can be viewed from the two dimensionalities of time-of-flight and wavelength. For example, in the wavelength dimension, singular time-of-flight triggering can isolate the effect of various instantaneous signal noises. Whereas in the time-of-flight dimension, averaging over multiple times-of-flight will reduce a variance in the measurement of range $\Delta_t$. With respect to false alarm identification, if only a single triggered point 88 is detected, then a false alarm condition is likely to have occurred. However, if there are multiple triggered points 88 that are closely related together, then an overheat condition can be more accurately declared. Additionally, fiber optic sensor system 12 allows for detection of relatively low overheat temperatures.

FIG. 6B includes graph 78C of reflection intensity as a function of wavelength corresponding to FBG sensors of fiber optic sensor system 12 and shows wavelength axis 80C, time axis 82C, points 84C, set 86C of triggered points 88C, wavelength $\lambda_0$, wavelength $\lambda_a$, range $\Delta_t$, and range $\Delta_\lambda$.

In the example shown in FIG. 6B, graph 78C depicts set 86C of triggered points 88C as being larger in size than 86B of triggered points 88B shown in graph 78B of FIG. 6A. A portion of set 86C is shown as having a larger range $\Delta_\lambda$ than range $\Delta_\lambda$ of set 86B. Additionally, set 86C is shown as overlapping across wavelength $\lambda_a$.

Once the values of time t of trigger points 70, 88B, and/or 88C, as well as for range $\Delta_t$ and range $\Delta_\lambda$, are determined, controller 30 determines the locations of any anomaly fiber Bragg gratings based on the time-of-flight values. For example, the speed of the optical pulse (i.e., the speed of light in optical fiber network 16) is known, and so once the time-of-flight value is determined, controller 30 can calculate a distance of an anomaly fiber Bragg grating from control unit 14 by multiplying the speed of the optical pulse by the one half of the time-of-flight. Controller 30 can also determine an extent of an overheat condition based upon a position of a window defined by range $\Delta_t$ and range $\Delta_\lambda$. For example, specific amounts of change in wavelength $\lambda$ can correlate to known temperature changes, such that a change of X nanometers (or picometers) in wavelength equates to a change of Y degrees in the temperature at the anomaly fiber Bragg grating.

In some examples, there can be a need to further lower the triggering threshold due practical constraints of fiber optic system 12 and/or optical fiber network 16. In such an example, a multiple-crossing time-of-flight detector can be implemented such that there can be multiple time-of-flight points determined with a scan of a single wavelength. For example, the triggering threshold of reflection intensity is set by controller 30 at a lower value (e.g., less than triggering threshold 68 shown in FIG. 4) in the pulse response data of the reflected optical signals from sensors $S_1$-$S_N$ that is created by controller 30.

Discussion of Possible Embodiments

The following are non-exclusive descriptions of possible embodiments of the present invention.

A method for detecting and determining a location of an overheat condition along an optical fiber includes executing a first set of steps including producing a narrowband optical signal at a wavelength with at least one of a laser source and an optical pulse generator. The optical signal is sent into the optical fiber that includes a plurality of fiber Bragg gratings at spaced locations. A plurality of reflected optical signals reflected by the plurality of fiber Bragg gratings is received. Reflection intensities of the plurality of reflected optical signals are detected using a photodetector. The reflection intensities are compared with a triggering threshold of reflection intensity. Response times of the plurality of reflected optical signals are recorded whenever the reflection intensity of the optical signals is greater than the triggering threshold. The narrowband optical signal is adjusted to another, different wavelength. The above steps are repeated in order to step through a range of discrete wavelengths. An anomaly reflected optical signal is identified using a characteristic of the timings obtained through a range of wavelengths. The location of the overheat condition recorded response times is calculated with a first controller. The location and existence of the overheat condition is communicated to a second controller.

The method of the preceding paragraph can optionally include, additionally and/or alternatively, any one or more of the following steps, features, configurations and/or additional components.

The optical signal can have a starting wavelength that can correlate to a measurement parameter, wherein the starting wavelength can be controlled by the controller in combination with the optical pulse generator.

The measurement parameter can comprise a threshold temperature at one or multiple locations of the optical fiber.

Whether the overheat condition is present can be determined.

A location of the overheat condition can be determined based on the identified anomaly reflected optical signal.

The location of the overheat condition can be determined substantially simultaneously with determining the presence of the overheat condition.

A first center wavelength of the optical signal sent into the optical fiber can be adjusted with the controller, a second optical pulse with a second center wavelength can be scanned, a range of wavelengths can be stepped through, examining timings can be obtained from at least one of an up-crossing and a down-crossing the triggering threshold of reflection intensity, and/or the triggering threshold of reflection intensity can be varied.

An optical sensing system includes an optical fiber and a control unit. The optical fiber includes a plurality of fiber Bragg gratings at spaced locations. The control unit is physically connected to and in optical communication with the optical fiber and includes an optical pulse generator, a photodetector, a timing detector, a comparator, and a controller. The optical pulse generator is in optical communication with the optical fiber and produces and emits an optical signal into the optical fiber. The optical signal has a starting wavelength that correlates to a measurement parameter. The photodetector is in optical communication with the optical fiber and receives a plurality of reflected optical signals from the plurality of fiber Bragg gratings. The photodetector detects a reflection intensity of each of the plurality of reflected optical signals. The timing detector is in communication with the photodetector and detects a response time of each of the plurality of reflected optical signals. The comparator is in communication with the photodetector and compares the reflection intensities of the reflected optical signals with a reflection intensity triggering threshold. The comparator identifies an anomaly reflected optical signal that is above the reflection intensity triggering threshold based upon the comparison of the reflection intensity of the reflected optical signal with the reflection intensity triggering threshold. The anomaly reflected optical signal is from an anomaly fiber Bragg grating. The controller is in electrical communication with the optical pulse generator and with the timing detector. The controller determines the location of the anomaly fiber Bragg grating based on a time-of-flight between transmission of the optical signal by the optical pulse generator and detection of the anomaly reflected optical signal by the photodetector.

The system of the preceding paragraph can optionally include, additionally and/or alternatively, any one or more of the following features, configurations and/or additional components.

A laser source can be disposed in the control unit, wherein the laser source can be connected to the optical pulse generator.

An optical component can be disposed in the control unit and/or connected to each of the optical fiber, the optical pulse generator, and/or the photodetector, wherein the optical component can be configured to transmit the optical signal from the optical pulse generator to the optical fiber, and wherein the optical component can be configured to transmit the plurality of reflected optical signals from the plurality of fiber Bragg gratings to the photodetector.

The controller can be further configured to determine an extent of an overheat condition based upon timing information recorded by the timing detector.

The controller, in combination with the optical pulse generator, can adjust a first center wavelength of the optical signal sent into the optical fiber, the optical sensing system can scan the optical fiber with a second optical pulse with a second center wavelength, the controller can step through a range of wavelengths for scanning the optical fiber, the controller can examine timings obtained from at least one of an up-crossing and a down-crossing the triggering threshold of reflection intensity, and/or the controller can vary the triggering threshold of reflection intensity.

The controller can log times-of-flight of the plurality of reflected optical signals and a wavelength of the optical signal, the controller can create a graph representative of the measured times-of-flight, and/or the controller can determine whether a density of time-of-flight points is greater than or equal to a threshold value.

A method of identifying an anomaly pulse response signal of an optical sensing system includes setting, with an optical pulse generator, a wavelength of a wavelength-tunable optical signal pulse. The wavelength-tunable optical signal pulse is emitted into an optical fiber that includes a plurality of fiber Bragg gratings at spaced locations. A plurality of reflected optical signals from the plurality of fiber Bragg gratings is received with a photodetector. Times-of-flight of the plurality of reflected optical signals are measured with a timing detector. The times-of-flight of the plurality of reflected optical signals and the wavelength of the wavelength-tunable optical signal pulse are logged. Whether a cycle count is equal to a preset amount of cycle steps is determined. When the cycle count is less than the preset amount of cycle steps, then emitting the wavelength-tunable optical signal pulse into the optical fiber is repeated along with the subsequent steps thereafter. When the cycle count reaches the preset amount of cycle steps, then the measured times-of-flight are graphed. A two-dimensional window is created such that a first dimension of the two-dimensional window is defined by a wavelength range Δλ and a second dimension of the two-dimensional window is defined by a time range Δt. The two-dimensional window is applied to the times-of-flight. A position of the two-dimensional window is changed. Whether a density of time-of-flight points in the two-dimensional window is greater than (or equal to) a threshold value is determined. When the density of time-of-flight points in the two-dimensional window is greater than (or equal to) a threshold value, then detection of an overheat condition is declared and a temperature and a location of the overheat condition is obtained. When the density of time-of-flight points in the two-dimensional window is less than a threshold value, then a position of the two-dimensional window is set to a new position and the step of changing the position of the two-dimensional window and the step(s) thereafter are repeated.

The method of the preceding paragraph can optionally include, additionally and/or alternatively, any one or more of the following steps, features, configurations and/or additional components.

The anomaly pulse response signal can correspond to a pulse response signal generated by an anomaly fiber Bragg grating, a location of the anomaly fiber Bragg grating can correspond to the location of the overheat condition, and/or the location of the overheat condition can be communicated to a health management system of an aircraft via an avionics controller.

A response time of the anomaly pulse response signal can be identified and/or the location of the anomaly fiber Bragg grating that the anomaly pulse response signal was reflected from can be determined.

A triggering threshold of reflection intensity can be determined based on a maximum amplitude of the pulse response data, and/or an extent of the overheat condition can be determined based upon timing information recorded by the timing detector.

A peak reflection intensity of the pulse response data can be identified and/or the reflection intensity triggering threshold can be set to equal the peak reflection intensity of the pulse response data.

Data from the anomaly pulse response signal can be transferred to an anomaly reflection intensity curve; the triggering threshold of reflection intensity can be mapped onto the anomaly reflection intensity curve; a number of times that the anomaly reflection intensity curve intersects with the triggering threshold of reflection intensity can be identified with the comparator; and/or a response time of the anomaly pulse response signal can be determined with the timing detector based on the number of intersections of the anomaly reflection intensity curve with the triggering threshold of reflection intensity.

Whether an overheat condition is present can be determined, and/or a location of the overheat condition can be determined.

Whether the overheat condition is present can be determined at the same time as determining the location of the overheat condition.

While the invention has been described with reference to an exemplary embodiment(s), it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for detecting and determining a location of an overheat condition along an optical fiber, the method comprising:
   (a) executing a first set of steps, the first set of steps comprising:
      i. producing a narrowband optical signal at a wavelength with at least one of a laser source and an optical pulse generator;
      ii. sending the optical signal into the optical fiber, wherein the optical fiber comprises a plurality of fiber Bragg gratings at spaced locations;
      iii. receiving a plurality of reflected optical signals reflected by the plurality of fiber Bragg gratings;
      iv. detecting, using a photodetector, reflection intensities of the plurality of reflected optical signals;
      v. comparing the reflection intensities with a triggering threshold of reflection intensity;
      vi. recording response times of the plurality of reflected optical signals whenever the reflection intensity of the optical signals is greater than the triggering threshold;
      vii. adjusting the narrowband optical signal to another, different wavelength; and
      viii. repeating steps (i)-(vii) in order to step through a range of discrete wavelengths;
   (b) identifying, based on the recorded response times, an anomaly reflected optical signal using a characteristic of the timings obtained through a range of wavelengths;
   (c) determining, with a first controller, the location of the overheat condition based on recorded response times;
   (d) communicating the location and existence of the overheat condition to a second controller; and
   (e) executing a second set of steps to determine the triggering threshold, the second set of steps comprising:
      i. adjusting, with the first controller in combination with the optical pulse generator, a first center wavelength of the optical signal sent into the optical fiber;
      ii. scanning the optical fiber with a second optical pulse with a second center wavelength;
      iii. stepping through a range of wavelengths;
      iv. examining timings obtained from at least one of an up-crossing and a down-crossing the triggering threshold of reflection intensity; and
      v. varying the triggering threshold of reflection intensity.

2. The method of claim 1, wherein the optical signal has a starting wavelength that correlates to a measurement parameter, wherein the starting wavelength is controlled by the first controller in combination with the optical pulse generator.

3. The method of claim 2, wherein the measurement parameter comprises a threshold temperature at a location of the optical fiber.

4. The method of claim 1, and further comprising determining whether the overheat condition is present based on the identified anomaly reflected optical signal.

5. The method of claim 4, and further comprising determining the location of the overheat condition substantially simultaneously with determining the presence of the overheat condition.

6. An optical sensing system comprising:
   an optical fiber comprising a plurality of fiber Bragg gratings at spaced locations;
   a control unit physically connected to and in optical communication with the optical fiber, the control unit comprising:
      an optical pulse generator in optical communication with the optical fiber, wherein the optical pulse generator emits an optical signal into the optical fiber, the optical signal having a starting wavelength that correlates to a measurement parameter;
      a photodetector, in optical communication with the optical fiber, that receives a plurality of reflected optical signals from the plurality of fiber Bragg gratings, and continually detects a reflection intensity of the plurality of reflected optical signals;

a comparator, in communication with the photodetector, that compares the reflection intensities of the reflected optical signals with a reflection intensity triggering threshold;

a timing detector, in communication with the comparator, that records a response time whenever the comparator changes status; and a controller, in communication with the optical pulse generator and with the timing detector, that identifies an anomaly reflected optical signal using a characteristic of the timings obtained through a range of wavelengths, that declares an anomaly fiber Bragg grating based on time-of-flight and wavelength, and that determines a location of the anomaly fiber Bragg grating that produces an anomaly pulse response signal based on a time-of-flight between transmission of the optical signal by the optical pulse generator obtained from response times; and further wherein:

the controller, in combination with the optical pulse generator, adjusts a first center wavelength of the optical signal sent into the optical fiber;

the optical sensing system scans the optical fiber with a second optical pulse with a second center wavelength;

the controller steps through a range of wavelengths for scanning the optical fiber;

the controller examines timings obtained from at least one of an up-crossing and a down-crossing the triggering threshold of reflection intensity; and the controller varies the triggering threshold of reflection intensity.

7. The optical sensing system of claim 6, further comprising a laser source disposed in the control unit, wherein the laser source is connected to the optical pulse generator.

8. The optical sensing system of claim 6, further comprising an optical component disposed in the control unit and connected to each of the optical fiber, the optical pulse generator, and the photodetector, wherein the optical component is configured to transmit the optical signal from the optical pulse generator to the optical fiber, and wherein the optical component is configured to transmit the plurality of reflected optical signals from the plurality of fiber Bragg gratings to the photodetector.

9. The optical sensing system of claim 6, wherein the controller is further configured to determine an extent of an overheat condition based upon timing information recorded by the timing detector.

10. The optical sensing system of claim 6, further wherein:

the controller logs times-of-flight of the plurality of reflected optical signals and a wavelength of the optical signal; and the controller determines whether a density of time-of-flight points is greater than or equal to a threshold value.

11. A method of identifying an anomaly pulse response signal of an optical sensing system, the method comprising:

i. setting, with an optical pulse generator, a wavelength of a wavelength-tunable optical signal pulse;

ii. emitting, with the optical pulse generator, the wavelength-tunable optical signal pulse into an optical fiber, wherein the optical fiber comprises a plurality of fiber Bragg gratings at spaced locations;

iii. receiving, with a photodetector, a plurality of reflected optical signals from the plurality of fiber Bragg gratings;

iv. measuring, with a timing detector, times-of-flight of the plurality of reflected optical signals;

v. logging the times-of-flight of the plurality of reflected optical signals and the wavelength of the wavelength-tunable optical signal pulse;

vi. determining whether a cycle count is equal to a preset amount of cycle steps, wherein:
  a. when the cycle count is less than the preset amount of cycle steps, then repeat steps ii through vi; or
  b. when the cycle count reaches the preset amount of cycle steps, then go to step vii;

vii. graphing the measured times-of-flight;

viii. creating a two-dimensional window, wherein a first dimension of the two-dimensional window is defined by a wavelength range $\Delta\lambda$ and a second dimension of the two-dimensional window is defined by a time range $\Delta t$;

ix. applying the two-dimensional window to the times-of-flight;

x. changing a position of the two-dimensional window;

xi. determining whether a density of time-of-flight points in the two-dimensional window is greater than (or equal to) a threshold value; wherein
  c. when the density of time-of-flight points in the two-dimensional window is greater than (or equal to) a threshold value, then:
    detection of an overheat condition is declared; and
    a temperature and a location of the overheat condition is obtained; or
  d. when the density of time-of-flight points in the two-dimensional window is less than a threshold value, then:
    a position of the two-dimensional window is set to a new position; and
    steps x through xi are repeated.

12. The method of claim 11, wherein the anomaly pulse response signal corresponds to a pulse response signal generated by an anomaly fiber Bragg grating, wherein a location of the anomaly fiber Bragg grating corresponds to the location of the overheat condition, and wherein the location of the overheat condition is communicated to a health management system of an aircraft via an avionics controller.

13. The method of claim 12, and further comprising:
identifying a response time of the anomaly pulse response signal; and
determining the location of the anomaly fiber Bragg grating that the anomaly pulse response signal was reflected from.

14. The method of claim 11, and further comprising:
determining a triggering threshold of reflection intensity based on a maximum amplitude of the pulse response data; and
determining an extent of the overheat condition based upon timing information recorded by the timing detector.

15. The method of claim 14, wherein determining the triggering threshold of reflection intensity further comprises:
identifying a peak reflection intensity of the pulse response data; and
setting the reflection intensity triggering threshold to equal the peak reflection intensity of the pulse response data.

16. The method of claim 11, and further comprising:
transferring data from the anomaly pulse response signal to an anomaly reflection intensity curve;

mapping a triggering threshold of reflection intensity onto the anomaly reflection intensity curve;

identifying, with the comparator, a number of times that the anomaly reflection intensity curve intersects with the triggering threshold of reflection intensity; and determining, with the timing detector, a response time of the anomaly pulse response signal based on the number of intersections of the anomaly reflection intensity curve with the triggering threshold of reflection intensity.

17. The method of claim 11, and further comprising:
determining whether an overheat condition is present; and
determining a location of the overheat condition.

18. The method of claim 17, and further comprising determining whether the overheat condition is present substantially simultaneously with determining the location of the overheat condition.

\* \* \* \* \*